United States Patent Office 2,768,898
Patented Oct. 30, 1956

2,768,898
SODIUM CHLORIDE COMPOSITION

Frank Waldo, Pittsburgh, Pa., assignor to Columbia-Southern Chemical Corporation, Allegheny County, Pa., a corporation of Delaware No Drawing. Application March 27, 1952,
Serial No. 278,965

3 Claims. (Cl. 99—143)

This invention relates to a novel form of edible salt. It is commonly recognized that crystalline sodium chloride tends to absorb water, on standing in atmospheric air of normal humidity, to such an extent that the crystals tend to coalesce and the product becomes lumpy.

According to the present invention, it has been found that a stable weather-proof composition may be provided by mixing crystalline edible sodium chloride with a small amount, usually in the range of ½ to 5 percent by weight, of finely divided, precipitated, hydrated silica. Edible salt compositions comprising sodium chloride and the above described hydrated silica are stable and do not agglomerate even when allowed to stand in a humid atmosphere for long periods of time.

The silica which is used according to this invention is a finely divided precipitated silica having an average ultimate particle size below 0.1 micron and containing "bound" water. Bound water is water which is not driven off when the silica is heated in a laboratory oven at 105° C. for 24 hours. Such water appears to be in chemical combination with the silica but may be driven off when the silica is heated at an elevated temperature, for example, 1000° C.

The amount of bound water which is present depends upon conditions of drying of the silica. In general, it will be present in the proportion of about 1 mole of $H_2O$ per 3 to 85 moles of $SiO_2$. Uncalcined silica used according to this invention contains 3 to 8 moles of $SiO_2$ per mole of $H_2O$. Products which have been calcined at 300–800° C. contain in the range of 15 to 85 moles of $SiO_2$ per mole of $H_2O$. This silica has a surface area of 75 to 200 square meters per gram. It may also contain up to about 10 percent by weight of "free" water, i. e., water which is driven off when the silica is heated in a laboratory oven for 24 hours at 100° C.

Silica to be used according to this invention has been prepared as follows:

Streams of aqueous sodium silicate solution containing 100 grams per liter of $SiO_2$ as $Na_2O(SiO_2)_{3.36}$ and calcium chloride solution containing 100 grams per liter of $CaCl_2$ and 30 to 40 grams per liter of sodium chloride were fed directly into the central area of a centrifugal pump at 150° F. The rates of flow were adjusted so that calcium chloride was approximately 10 percent in excess over the stoichiometric quantity required for reaction, and so that the amount of liquid supplied to the pump was about 25 percent below the output capacity of the pump. In consequence, the solutions were subjected to turbulent intermixing in the pump.

The slurry of calcium silicate thus produced was introduced into a tank and sufficient hydrochloric acid solution containing 28 percent by weight of HCl was added, with stirring, to reduce the pH of the slurry to 2. Thereupon, sufficient sodium hydroxide solution containing 40 percent by weight of NaOH was added to raise the pH of the slurry to 7.5. The precipitated silica was recovered by decantation and filtration and was dried in an oven at a drying temperature of 120 to 140° C. for 12 hours. The free water content of the product was within the range of 3 to 8 percent by weight of the pigment.

The silica is incorporated in the salt composition simply by mixing commercial edible crystalline sodium chloride, which may or may not contain impurities, with the finely divided silica. This mixing may be effected in any conventional equipment for mixing solids. One-half to 5 percent by weight of the silica, based upon the weight of sodium chloride, is sufficient for the purpose, the usual concentration being about 2 percent by weight.

The salt may contain other materials, such as potassium or sodium iodide and like materials, commonly appearing in edible salt.

Although the present invention has been described with reference to the specific details of certain embodiments, it is not intended that such details shall be regarded as limitations upon the scope of the invention except insofar as included in the accompanying claims.

What is claimed:

1. An edible salt composition stabilized against agglomeration due to absorption of moisture comprising an edible grade of crystalline sodium chloride and from ½ to 5 percent by weight, based on the weight of sodium chloride, of finely divided, precipitated, hydrated silica having the composition $H_2O \cdot (SiO_2)_x$ where $x$ is 3 to 50, a surface area of 75 to 200 square meters per gram of said silica, and an average ultimate particle size below 0.1 micron.

2. The composition of claim 1 wherein the silica is 2 percent by weight of the common salt.

3. The composition of claim 1 wherein the silica contains 2 to 10 percent by weight of free water.

References Cited in the file of this patent
UNITED STATES PATENTS

| | | |
|---|---|---|
| 1,978,040 | Daitz | Oct. 23, 1934 |
| 2,407,151 | Glogau | Sept. 3, 1946 |
| 2,664,357 | Miller | Dec. 29, 1953 |